United States Patent [19]

Faith

[11] Patent Number: 4,868,858
[45] Date of Patent: Sep. 19, 1989

[54] KEYPAD/DIALLER INTERFACE FOR TELEPHONE TEST SET

[75] Inventor: Richard W. Faith, Oxnard, Calif.
[73] Assignee: Harris Corporation, Melbourne, Fla.
[21] Appl. No.: 227,649
[22] Filed: Aug. 3, 1988
[51] Int. Cl.⁴ .............................................. H04M 1/24
[52] U.S. Cl. ..................................... 379/21; 379/350; 379/360
[58] Field of Search ................. 379/21, 355, 350, 360, 379/361, 362

[56] References Cited

U.S. PATENT DOCUMENTS

4,194,098  3/1980  Carlson .................................. 379/21

Primary Examiner—Stafford D. Schreyer
Attorney, Agent, or Firm—Antonelli, Terry & Wands

[57] ABSTRACT

The functionality of the keypad of a telephone test set is augmented by an interface circuit arrangement which enables keys of the keypad to be used to control both dialing signal generation and prescribed test functions, while effectively preventing interference between the operation of a dialing signal generator, to which the keypad is coupled during a first mode of operation, and that of test function signal generator circuitry, provided exclusive of the dialing signal generator, during a second mode of operation. Additionally, the test set includes a ringing signal coupling circuit for enabling the test set microphone, through which a telephone craftsperson voices audio speech signals to a speech signal processing circuit, to be used to audiblize the ringing signal, without impacting the normal voice input functionality of the microphone and associated speech signal processor.

23 Claims, 6 Drawing Sheets

KEYPAD/DIALLER INTERFACE FOR TELEPHONE TEST SET

FIELD OF THE INVENTION

The present invention relates in general to telephone test set equipment and is particularly directed to a keypad-to-dialler interface arrangement through which the keypad of a telephone test set may be used to generate prescribed test signals (in addition to its normal dialling signal generation control function), without interfering with the normal operation of an associated dialling signal generator. In addition, the invention provides a circuit arrangement which allows the handset microphone to be used as a means of providing audible ringing to the craftsperson.

BACKGROUND OF THE INVENTION

Telephone equipment service personnel, or craftspersons, typically employ a hand-held test set which, when coupled to terminals of a telephone circuit to be tested, may be used to generate prescribed test signals and to access a selected telephone unit by the operation of one or more keys, buttons or switches contained within the test set.

Typically, the keypad of the telephone test set is comprised of a matrix (in the form of rows and columns) of key contact links, the crosspoints of which are electrically coupled to one another by the operation of the keys or pushbuttons of the keypad, so as to provide signals to an associate telephone dialling signal generator (usually in the form of an integrated telephone dialler chip), which generates the appropriate dialling signal (pulse or DTMF signal). Because the test set may be exposed to a variety of environments, its physical housing is normally waterproofed and, in general, ruggedized, in order to minimize damage due to shock and to present the intrusion of moisture and foreign matter.

Now, although augmenting the normal dialling signal functionality of the test set keypad by the addition of modified control circuitry and attendant switches would serve to increase the capabilities of the test set, such an approach would require providing extra holes in the physical case in which the telephone test set circuitry is housed (for mounting the additional switches) and, in turn, would require a suitable mechanism for effectively sealing the housing. Simply put, the more holes that are provided in the test set housing (to mount the additional switches), the greater likelihood there is for the intrusion of moisture or foreign matter.

One approach that might be used to take advantage of the already existing keypad contact link matrix would be the installation of a "second function" or "shift" key, which could serve to selectively port the keypad contact links to either the telephone dialling signal generator, or to additional test circuitry, as desired. However, because of the way in which telephone dialling signal generator circuitry typically detects key-contact closures, it is generally difficult to operate such dialler circuitry in tandem with other electronic circuits which share or are controlled by a common keypad.

More specifically, the typical commercially available telephone dialling signal generator normally operates in a standby mode, with all of the keypad contact link inputs that lie along a first keypad axis (e.g. all of the "column" contact links) asserted 'high' and with all of its keypad contact link inputs that lie along a second axis (e.g. all of the "row" contacts) resistively tied 'low' and, additionally, connected to sensing transistor circuitry. In this typical configuration, no significant current flows until one of the keypad contact link crosspoints is closed by the operation (depression) of its associated key (e.g. keypad button). When a key is operated, the second axis (e.g. "row") position of that key may be immediately determined, but the chip still must "test" the contact links of the keypad in order to locate the first axis (e.g. column) position of the depressed key.

One possible technique that may be employed by the dialler circuitry to test the location of the depressed key would be to reverse the roles of the first and second axis contact links, such that all of the second axis contact links are asserted 'high', while pull-down resistors and sensing transistors are connected to the first axis contact links, thereby allowing the first axis (e.g. "column") position of the depressed key switch to be located.

Regardless of the mechanism for carrying out this functionality, a basic problem exists in that all of the dialling signal generator keypad inputs are, in reality, sometimes acting as inputs and sometimes acting as outputs. As a consequence, any other electronic device that supplies output signals that may be coupled to such circuitry is likely to interfere with its operation, and any device that may receive inputs from a terminal to which the contact links are connected is likely to suffer interference caused by the operation of the dialling signal generator circuit.

SUMMARY OF THE INVENTION

In accordance with the present invention, the functionality of the keypad of a telephone test set is augmented by an interface circuit arrangement, intercoupled between the keypad contact matrix and the test set's telephone dialling signal generator, which enables the keypad to be used for both accessing the telephone dialling signal generator and to controllably activate prescribed test function circuitry, without subjecting either the dialling circuitry or the additional test function circuitry to interference as a result of the use of the same set of keypad switches for controlling each separate function.

For this purpose, the interface circuit arrangement of the present invention contains a first plurality of controlled transmission gate circuits, respective ones of which are coupled between the row contact link and column contact link output ports of the keypad matrix and row and column input ports of the telephone dialling signal generator, for controllably decoupling the keypad contact links from the telephone dialling signal generator for a first, standby mode of operation. During this standby mode, a second plurality of controlled transmission gate circuits is enabled, so as to permit keyswitch operation detection and control circuitry, to which the second plurality of transmission gates are coupled, to monitor the operation of the keypad and determine whether a depressed key is one of a preselected group (e.g. within a particular row or column) for which additional functionality has been provided. If it is determined that the depressed key is one of the preselected group; then the control circuitry enables associated function signal generator circuitry to respond to the operation of the depressed key and generate an appropriate auxiliary test signal (e.g. groundstart). If it is determined that the depressed key is not one of the preselected group, then the control circuitry disables the function signal generator circuitry and reverses the conductive states of the first and second pluralities of transmission gates. This state reversal operation isolates the keyswitch operation detection and control circuitry from the keypad output ports and couples these ports directly to the dialling signal generator, so that it may respond to the operation of the keypad. To controllably by-pass the augmented functionality of the interface circuit, an auxiliary mode switch and associated control logic is provided, so that the interface circuit may be 'forced' into a direct-coupling mode, in which the keypad output ports are coupled directly to the dialling signal generator.

To ensure that there is no simultaneous monitoring of the keypad contact links by the dialling signal generator and the keyswitch operation detection and control circuitry, the interface circuitry is provided with a timeout circuit, which is responsive to the operation of the telephone dialling signal generator and prevents the first and second pluralities of transmission gates from being placed in the standby mode of operation, and thereby prevents the keypad contact links from being monitored by the keyswitch operation detection and control circuitry, for a prescribed period of time subsequent to the termination of operation of the telephone dialling signal generator.

In accordance with a further test set-enhancement feature of the present invention, a circuit arrangement is provided which allows the test set microphone to be used as a means of providing audible ringing to the craftsperson, thereby further improving hardware functionality, without impacting the normal voice input functionality of the microphone and associated speech signal processor. To this end, the test set's ringing signal detector circuit is electrically coupled, through a D.C. blocking capacitor and transformer, to signal coupling ports of the handset microphone, through which a telephone craftsperson normally voices audio speech signals to a speech signal processing circuit. Coupled in circuit with the microphone and input ports of the speech signal processing circuit is a resistive impedance, rectifier circuit which effectively limits, at the input ports of the speech signal processing circuit, the amplitude of ringing signals that are coupled by the transformer to the microphone. The resistive impedance, rectifier circuit is coupled with a mute switch connection for switchably bridging the input ports of the speech signal processing circuit, such that the closure of said mute switch places the resistive impedance across the second winding of said transformer and thereby across the microphone, so as to inhibit voice transmission with only a minimal effect upon the audible-ringing function of the microphone.

BRIEF DESCRIPTION OF THE DRAWINGS

FIG. 6 shows the manner in which FIGS. 2-5 are to be arranged to show the internal circuitry function of the keypad interface unit; and FIG. 7 is a diagrammatic illustration of a circuit arrangement for permitting the handset microphone to provide audible ringing.

DETAILED DESCRIPTION

Figure 1:
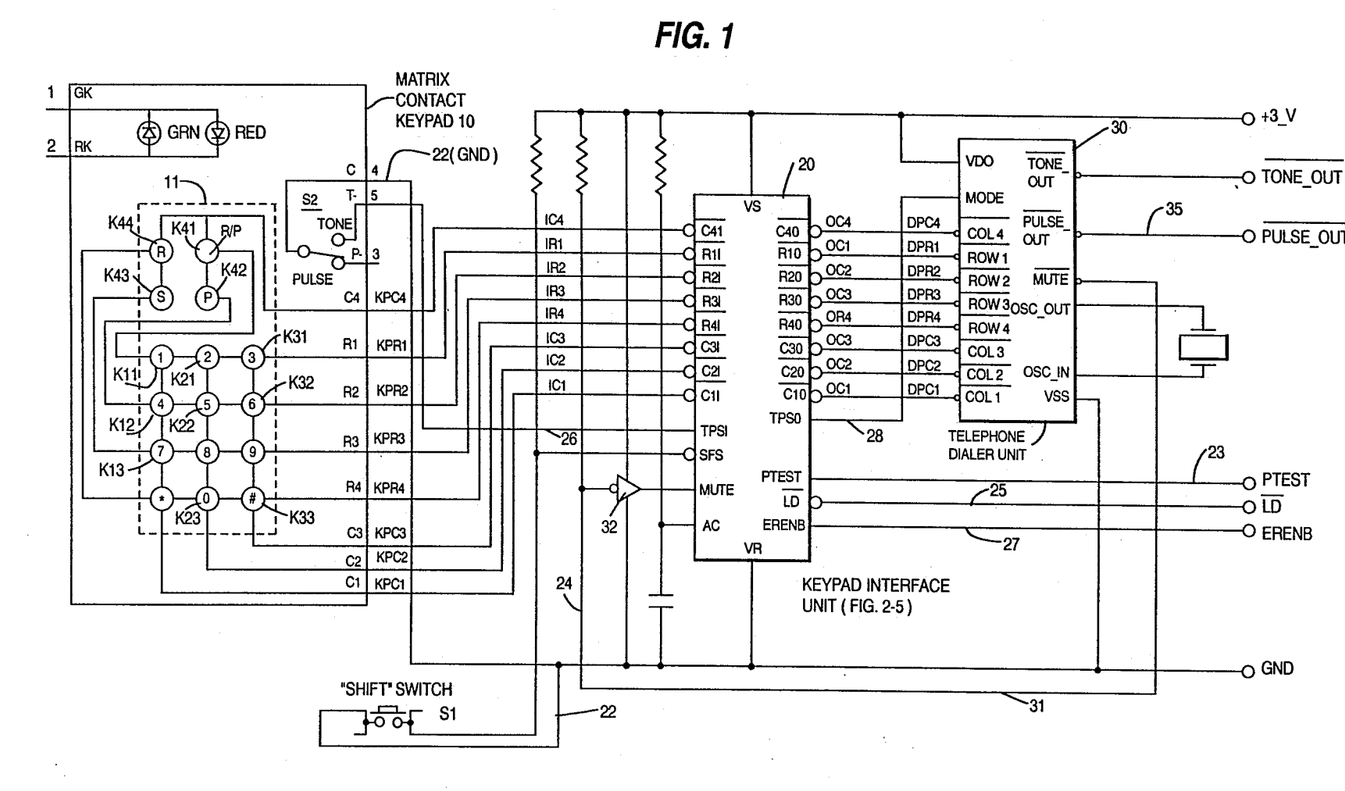
FIG. 1 is a diagrammatic illustration of a keypad, telephone dialling signal generator and keypad interface unit in accordance with the present invention.

Referring now to FIG. 1, there is diagrammatically illustrated that portion of a craftsperson's telephone test set, containing a matrix keypad 10 and an associated telephone dialling signal generator unit 30, which are coupled with one another and with a keypad interface unit 20 of the present invention, to be described in detail below in conjunction with the circuit illustrations of FIGS. 2-5. The matrix contact keypad 10 is shown as comprising a contact key matrix 11, which contains a matrix of keys (typically push-button switches) K11 . . . K44 which, when operated (depressed), controllably electrically interconnect the crosspoints of respective columns C1 . . . C4 and rows R1 . . . R4 of conductive contact links which extend to associated signal coupling ports of the keypad. Switches K11 . . . K34 correspond to the standard numerical digit, asterisk and pound sign keys, as shown, while the additional function keys of column C4 are associated with test function designations "R/P", "P", "S" and "R" (to described infra) for rows R1 . . . R4, respectively, as shown. These sixteen keys K11 . . . K44 typically define the matrix keypad of a conventional telephone test set and are used to controllably invoke prescribed dialling signals (either pulse or dual tone multi-frequency) from an associated telephone dialler unit 30.

For this purpose, the respective row and column contact link ports KPR1 . . . KPC4 of the keypad 10 are normally directly connected to a corresponding set of row and column input ports DPR1 . . . DPC4 of the telephone dialler unit 30. Pursuant to the present invention, however, a keypad interface unit 20 is interposed between the contact link ports of the keypad 10 and the telephone dialler unit 30 and serves the dual purpose of enabling the craftsperson to use the keypad to access the telephone dialler unit, for a dialling mode of operation, and to provide additional test signal functionality through the operation of one or more keys resident within a preselected group of keys (e.g. one of the rows or columns of keys), for a test function mode of operation.

As will be explained in detail below, an additional auxiliary mode, or "shift", switch S1 is coupled with the control logic of the interface unit 20, in order to permit the craftsperson to effectively by-pass the normal standby, keypad-monitoring mode of operation of the interface unit and selectively force the interface unit to directly couple all of the ports of the keypad 10, including those associated with the preselected group of keys, to the dialling signal generator unit 30, for normal dialling applications. For purposes of providing an illustrative example, it may be assumed that telephone dialler unit 30 comprises a commercially available telephone dialler chip, such as a Sharp LR4802 chip, which is capable of producing either dual tone or pulse dial signals in response to the operation of keypad switches which close the crosspoints of an associated set of conductive row (R1-R4) and column (C1-C4) contact links of the keypad matrix.

As pointed out above, in the diagrammatic illustration of a keypad shown in FIG. 1, columns C1-C3 contain the twelve numerical digit, asterisk and pound sign keys, while column C4 contains additional function keys having test function designations "R/P", "P", "S" and "R", respectively residing in rows R1 . . . R4, as shown, for a conventional telephone test set which, when operated (depressed by the craftsperson) controllably invoke prescribed dialling signals (either pulse or dual tone multi-frequency) from an associated telephone dialler unit 30. With respect to the function keys K41-K44 of column C4, activation of the "R" key is customarily used to invoke a "repertory-memory-recall" function; activation of the "R/P" key invokes the "redial" or "pause" functions, depending upon usage sequence; activation of the "S" key invokes the "repertory-memory-store" function; and activation of the "P" key invokes the "pause" function. Each of these functions is a standard dialling signal function of the above-identified commercially available telephone dialler chip and details of the signal process characteristics of that chip for carrying out this functionality will not be presented here, as such are unnecessary for an understanding of the present invention. It should be realized, of course, that if a dialling signal generator chip other than the specifically commercially identified one here were employed, the specific functions invoked by the activation of keys K41 ... K44 might be different; however, the manner in which they are processed by the keypad interface unit 20, to be described below, would not be affected.

As pointed out briefly above and as will be explained in detail infra, in accordance with the present invention, the normal mode of operation of the keypad interface unit is a (keypad-monitoring) standby mode, during which keypad operation monitoring and control circuitry is directly coupled to the keypad, while the dialler unit is effectively decoupled from the keypad. During this first, test function mode of operation of the interface unit, if any of a preselected group of keys of the keypad is operated, then an associated auxiliary test function signal is generated (by dedicated circuitry to be described), rather than the dialler unit (which is decoupled from the keypad and therefore cannot respond to key operation) performing its customary signal generation function. For purposes of providing an illustrative example, in the description to follow, the preselected group of keys of the keypad that are to be used to invoke auxiliary test functionality will be those keys resident in column C4 of the matrix, i.e. keys K41-K44. This auxiliary functionality will be invocable in the normal, standby mode of operation of the test set. Consequently, in order for these keys to be used to invoke their normal "R/P", "P", "S" and "R" functions, referenced above, a normally open auxiliary "shift" switch S1, which is used to override the standby mode and 'force' the interface unit to directly couple all of the keypad ports to the telephone dialler unit, must be operated (depressed). The auxiliary test functionality associated with the preselected group of keys (keys K41, K42, K43 and K44 of column C4) and invoked by the operation of these keys during the normal, standby mode of operation of the test set is as follows.

In the normal, standby mode, with the "shift" switch S1 not depressed, interface unit 20 responds to the closure of the "R" key K44, by asserting a 'high' state on output link 27 to a port identified as ERENB (Earth-Recall-Enable) or "ground start" output. The destination of the ERENB signal is a downstream switching circuit (not shown) which responds to a high state on this link by connecting an earth-ground to the telephone tip and ring leads, thereby effecting an "earth recall" (ground-start) condition.

With "shift" button S1 not depressed, interface unit 20 responds to the operation of the "R/P" key 41 by forcing the telephone dialler unit 30 into the "pulse" mode and simulates a key switch closure between the row DPR1 and column DPCI input ports of the telephone dialler unit 30. The result is an out pulsing of the digit "1", namely a loop-disconnect of approximately 60 milliseconds duration. Whether "tone" or "pulse" mode dialling is employed, is determined by a two-position toggle switch S2 which interconnects contacts 3, 4, and 5 of the matrix contact keypad 10. Line 22, which is coupled to contact 4, caries circuit ground, while line 26 applies the selected tone or pulse input signal to the keypad interface unit 20. The out pulsing of the digit "1" for a loop disconnect of approximately 60 milliseconds is used to produce a "recall" (hook flash) condition.

With the "shift" switch S1 being in its normally open condition, keypad interface unit 20 will respond to the closure of the "S" key K43 by asserting a low state on output link 25 to an output port LD-BAR (Line Disconnect, active-low). A downstream switching circuit, not shown, responds to the low state of the LD port by initiating a disconnected state of the tip-ring pair and maintaining that state until the "S" key K43 is released, thereby changing the state of output link 25 from low to high.

Activation of the "P" key K42 (with the "shift" S1 in its normally open condition) causes keypad interface unit 20 to assert a high state on output link 23 from its PTEST port. A downstream switching circuit (not shown) will, in turn, respond to the high state of this link by connecting a pair of red and green polarity-indicating light emitting diodes across the tip-ring pair to indicate tip-ring polarity, until the "P" button is released. The red and green polarity-indicating light emitting diodes are shown connected to ports 1 and 2 of the matrix contact keypad 10.

As will be explained in detail below in connection with the description of FIG. 2, which shows the internal circuitry of keypad interface unit 20, the MUTE-BAR port of the telephone dialler unit 30 is coupled over link 31 through an associated inverter 32 to a MUTE input of the keypad interface unit 20. When the telephone dialler unit 30 is active, this MUTE signal is used to effectively inhibit the monitoring of the operation of the keypad by circuitry within the keypad interface unit 20, so as to prevent interference or cross-coupling of signals from the keypad with respect to the dual functionality capabilities of the interface unit 20 (namely permitting the keypad to be used for normal dial signaling and for auxiliary test functions).

Referring now to FIGS. 2-5, (which are to be arranged in the manner shown in FIG. 6) the internal circuitry configuration and associated operation of the keypad interface unit 20 shown in FIG. 1 will be described.

Figure 2:
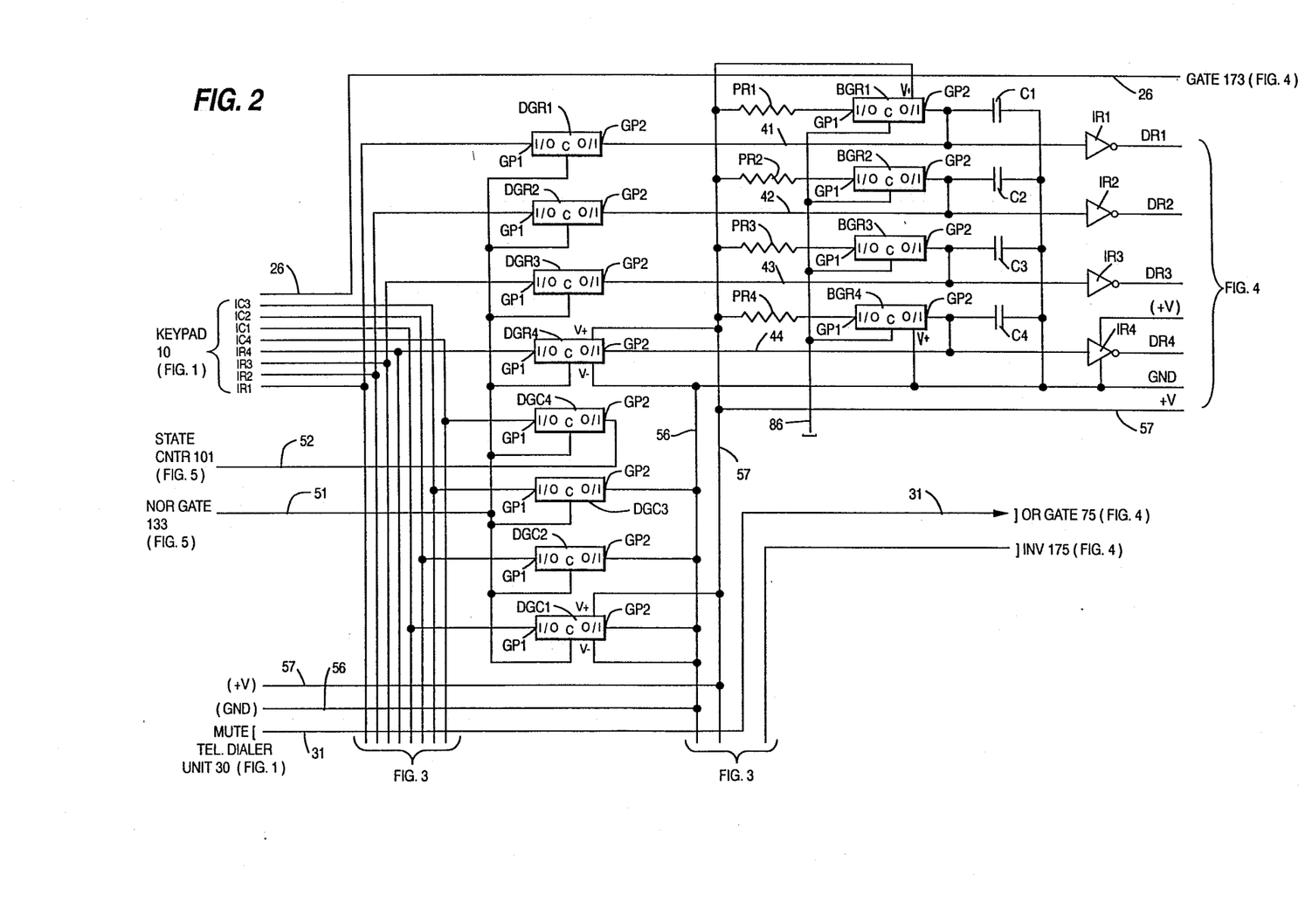
FIGS. 2-5 form a detailed schematic diagram of the internal circuitry of the keypad interface unit 20 of FIG. 1.

As shown in FIG. 2, the row and column ports KPR1 ... KPC4 of the keypad 10 are coupled over input links IR1 ... IC4 to a plurality (eight, corresponding to the total of the four columns C1-C4 and the four rows R1-R4 of the keypad) of respective normally enabled key-operation detect transmission gates DGR1 ... DGC4. Similarly, connected in parallel with the plurality of eight key-operation detect transmission gates DGR1 ... DGC4 is a plurality of eight normally isolating, keypad-to-dialler unit transmission gates IGR1 ... IGC4, shown in FIG. 3. Each transmission gate (which may comprise a conventional OSFET digital gate circuit) has first and second gate ports GP1 and GP2, respectively, and a control port G, the binary state of which controls whether gate ports GP1 and GP2 are conductively connected to one another or isolated from one another.

As will be explained below, transmission gates DGR1 ... DGC4 are controllably enabled by a signal supplied over link 51 from control circuitry shown in FIG. 5; during the standby condition (hereinafter identified as state 0) transmission gates DGR1 ... DGC4 are normally enabled (conductive), so that the keypad-interface unit links IR1 ... IC4 may be monitored for the purpose of sensing the operation of any of the keys of the keypad 10.

The first port of each transmission gates DGR1 ... DGC4 is coupled to a respective one of links IR1 ... IC4. The second gate port GP2 of each of transmission gates DGR1 ... DGR4 is coupled over a respective one of links 41 ... 44 to port GP2 of respective bias transmission gates BGR1 ... BGR4, to one side of capacitors C1 ... C4 and to an input of respective inverters IR1 . .. IR4, respectively. The other connection port GP1 of each of transmission gates BGR1 ... BGR4 is coupled through a respective pull-up resistor PR1 ... PR4 to a high state voltage bias link 57. The control port C of each of bias gates BGR1 ... BGR4 is coupled over a link 86 to monitoring circuitry in FIG. 5, to be described below. In the standby condition of the keypad interface unit 20, the state of link 86 causes each of gates BGR1 ... BGR4 to conductively interconnect its connection ports GP1 and GP2, thereby terminating each of links 41-44 to a high state through their associated pull-up resistors PR1 ... PR4.

Of the four column-associated key-operation detect transmission gates DGC1 ... DGC4, gates DGC1 ... DGC3 have their second connection ports GP2 coupled to a hard low (0=ground) voltage link 56. As a consequence, when enabled during the standby condition, each of key-operation detect transmission gates DGC1 ... DGC3 will terminate its associated keypad-to-interface unit input link IC1 ... IC3 with a low voltage.

Figure 5:
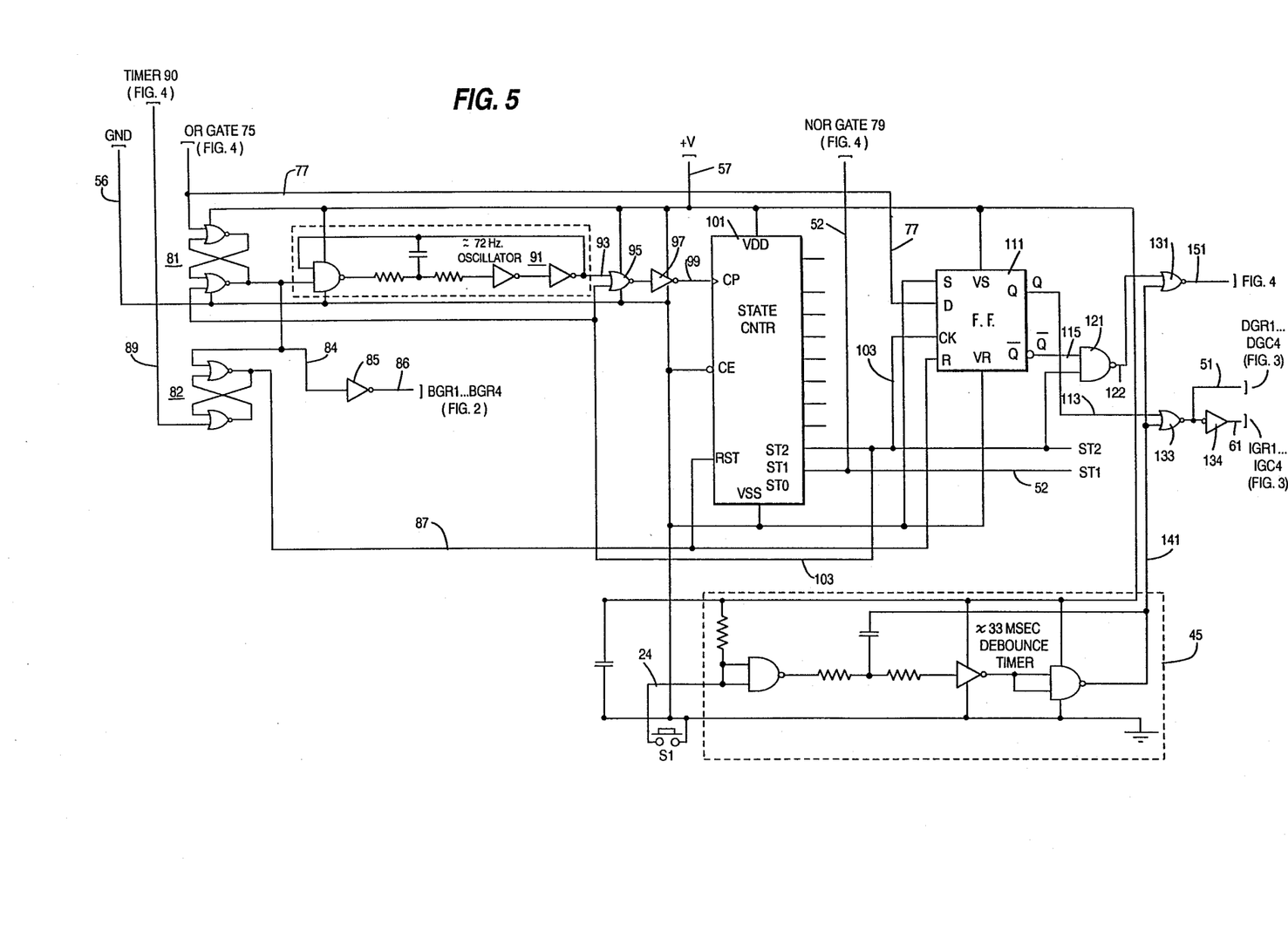

The remaining key-operation detect transmission gate DGC4, associated with column C4 in which the preselected group of keys K41-K44 resides, has its second connection port GP2 coupled over a 'state 1' link 52 to the monitoring circuitry shown in FIG. 5, and is used to selectively terminate keypad-to-interface unit link IC4 with a "high" state representative voltage (+V) when one of the keys K41 ... K44 of column 4 is depressed, as will be explained in detail below.

Figure 3:
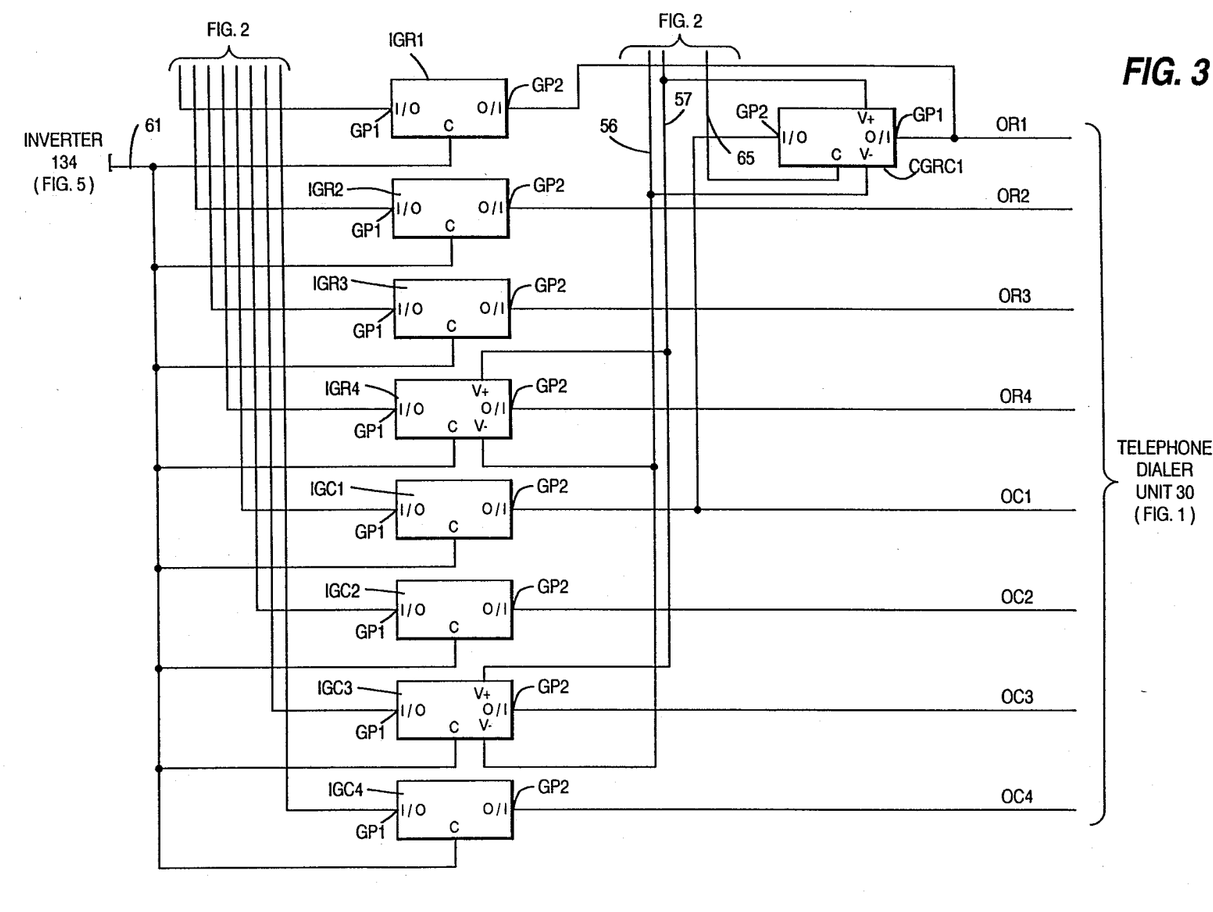
Figure 4:
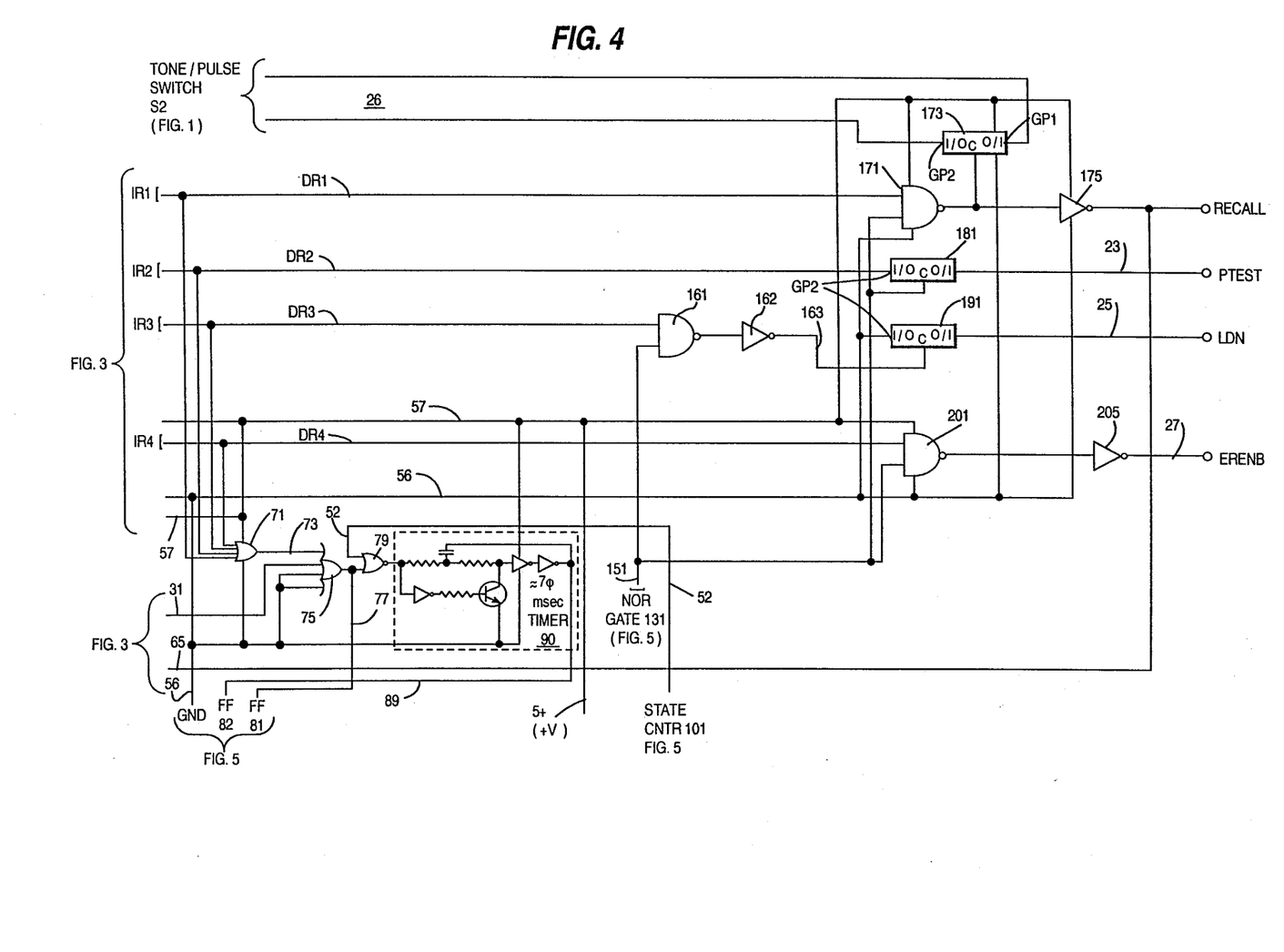

As pointed out above, the normally isolating keypad-to-dialler unit transmission gates IGR1 ... IGC4, shown in FIG. 3, provide a controlled decoupling of the row and column ports of the keypad 10 from the row and column input ports of the telephone dialler unit 30. For this purpose, each of transmission gates IGR1 ... IGC4 has its first connection port GPI coupled to a respective one of the keypad-to-interface unit connection links IR1 ... IC4, as shown. The second connection port GP2 of each of transmission gates IGR1 ... IGC4 is coupled over a respective output link OR1 ... OC4 to the respective row and column input connection ports DPR1 ... DPC4 of the telephone dialler unit 30. The control port of each of transmission gates IGR1 ... IGC4 is coupled over a link 61 to signal processing circuitry shown in FIG. 5.

As pointed out above, transmission gates IGR1 ... IGC4 normally isolate the keypad ports from the input ports of the telephone dialler unit 30. However, depending upon the mode of operation of the keypad invoked by the craftsperson, specifically, for a non-functional test mode (either by use of override switch S1 or operating a keypad key other than keys K41-K44), the logic state of link 61 is controlled so as to cause normally isolating transmission gates IGR1 ... IGC4 to change (conductive) state and provide a direct connection between the keypad output ports and the telephone dialler unit input ports, so that pulse or tone signaling may be produced in response to the activation of the appropriate keys of the keypad.

An additional transmission gate CGRC1 has its connection port GPI coupled to connection port GP2 of transmission gate IGC1 and its connection port GP2 coupled to connection port GP2 of transmission gate IGR1. Transmission gate CGRCI has its control port coupled over link 65 to function test circuitry illustrated in FIG. 4, to be described in detail below. As will be described in detail infra, transmission gate CGRCl is used in conjunction with the operation of "R/P" key K41 to invoke a "hookflash" test signal (simulating the generation of a "1" signal normally provided by operating key K11, which closes the crosspoint between row R1 and column C1, to which the ports of transmission gate CGRC1 are connected).

Cs pointed out above, monitoring and control circuitry within interface unit 20 comprises respective pluralities of transmission gates through which the output ports of the keypad 10 are monitored for the operation of key switches by the craftsperson and selectively connected to the telephone dialler unit 30 or used to invoke specified test function signals for operating downstream test equipment. The configuration and operation of the both the monitoring and control circuitry and dedicated test function invoking logic, and the manner in which the respective sets of transmission gates of FIGS. 2 and 3 are controlled can be best understood by considering the overall circuitry configuration of FIGS. 2-5, the details of the logic circuit components of FIGS. 4 and 5 of which will be explained in the course of the operation of the interface unit to follow.

In its normal, standby (state 0) condition, keypad interface unit 20 isolates, or decouples, the ports of keypad 10 from telephone dialler unit 30, so that operation of keypad switches may be monitored without causing interference with telephone dialler unit 30. This isolation between the ports KPR1 ... KPC4 of the keypad 10 and the input ports DPR1 ... DPC4 of telephone dialler unit 30 is performed by transmission gates IGR1 ... IGC4, as described above. In the standby condition, in the absence of the operation of auxiliary override switch S1, the state of link 61 is such as to cause a high impedance or open condition between connection ports GP1 ... GS2 of each of isolation gates IGR1 ... IGC4.

On the other hand, during the standby mode, each of transmission gates DGR1 ... DGC4 is normally enabled, so that the monitoring and control circuitry shown in FIGS. 4 and 5, to be described, is able to continuously monitor keypad activity. In addition, with each of transmission gates BGR1 ... BGR4 being enabled by link 86, a high pull-up resistor is coupled to the input of each of inverters IR1 ... IR4, so that a low output is asserted on each of detect row links DR1/ .. . DR4 and at each of the inputs to a key operation-detect OR gate 71.

During this normal standby condition, the signal level on link 52 is low (0=grounded); with each of transmission gates DGC1 . . . DGC3 having their second ports GP2 coupled to low voltage +0=ground) line 56, then the voltage state each of ports GP1 of column-associated transmission gates DGC1 . . . DGC4 will be low (0=ground), so as to provide a hard, low state on all of the keypad column links C1–C4. Each of the row links R1–R4 will be coupled to a respective one of pull-up resistors RR1 . . . RR4 through enabled transmission gates DGR1-4 and BGR1-4. Consequently, each of the row links of keypad 10 will be coupled to a high voltage (1=+V).

When any of the key switches K11 . . . K44 of keypad 10 is operated, that one of lines 41 . . . 44 to which the depressed key's row link is coupled will see a low voltage state, causing its associated inverter (IR1 . . . IR4) to produce a high state output. For purposes of providing an illustrative example, let iw be assumed that the "P" key K42 in row R2, of column C4 of keypad 10 is depressed. As a consequence, the output of inverter IR2 will change from a low state to a high state. This voltage level change is coupled over link DR2 to OR gate 71. OR gate 71/ in turn, couples a high output signal over link 73 to one input of OR gate 75, a second input of which is coupled over link 31 to receive the MUTE output of the telephone dialler unit 30.

As will be explained below, within the monitoring and control circuitry, OR gates 71 and 75, in conjunction with the operation of key-operation detect and bias transmission gate circuitry serve to indicate that 1—a key has been depressed, 2—whether or not the depressed key resides in column C4, and whether the depression of the key has caused operation of the telephone dialler unit 30.

At this point, it should be recalled that the present invention provides dual functionality for a preselected group of keys (keys K41 . . . K44 resident within column C4) of keypad 10. It is for this reason that column C4-associated transmission gate DGC4 has its port GP2 coupled to link 52. (It should be noted, however, that one or more keys, in addition to or in place of those resident in column C4, may be employed to provide the desired modified test function-invoking functionality of the interface unit in accordance with the present invention. The choice of column 4 is merely to provide a working example of the present invention and is not intended to limit the functionality of the same to this set or any other keys of the keypad. If additional keys are to be used for invoking further functions, additional ones of the key-operation detect transmission gates may be connected similar to transmission DGC4, as will be fully appreciated from the description above and the explanation of the invention to follow.

The high input to OR gate 75 causes its output to go high, so that a high logic level is coupled over link 77 to NOR-configured flip-flop 81, causing its output on link 84 to go high. Link 84 is coupled to inverter 85, the state of the output link 86 of which now changes from a high state to a low state, which causes each of transmission gates BGR1 . . . BGR4 to change from a low impedance to a high impedance condition, thereby effectively removing pull-up resistors RR1 . . . RR4 from links 41–44 and each of inverters IR1. . . . IR4. In addition, the output from flip-flop 81 on link 84 resets NOR-configured flip-flop 82, which, in the current standby state, is 'set', so as to remove the reset state from link 87 which is coupled to the reset input of each of a state counter 101 (which is currently reset to state 0) and a key location latch 111, whereby each of counter 101 and latch 111 is free to operate.

Link 84 is further coupled to state counter advance clock pulse generator (e.g. 72 Hz oscillator) 91, which begins to couple output pulses over link 93 to one input of NOR gate 95. The output of NOR gate 95 is coupled through inverter 97 over link 99 to the clock pulse input or state counter 101. In response to the first advance clock pulse produced by clock pulse generator 91, state sequence counter 101 will advance from state 0 to state 1, causing a change in state from a low to high level on state 1 (ST1) output link 52. As pointed out previously, link 52 is coupled to port GP2 of column C4-associated transmission gate DGC4. During the previous standby state (ST0), link 52 was low. When state counter 101 transitions from state 0 to state 1, the voltage level on link 52 goes high, thereby removing the low condition on link IC4 for the column C4 port KPC4 of keypad 10.

Link 52 is further coupled to one input of NOR gate 79, which serves to inhibit activity of timeout circuit 90, a rising-edge delay circuit set for nominally seconds of delay. As will be explained below, timeout circuit 90 serves to ensure that a possible interruption of the high-state output of gate 75 will not trigger flip-flops 81 and 82, which interruption would otherwise cause a reset signal to be applied over link 87 to state counter 101 and flip-flop 111. The output of timer 90 is coupled over link 89 to the reset input of latch 82, so as to set latch 82 to a high state when timer 90 times out; however, since timer circuit 90 is inhibited for the, duration of state 1, it is established that latch 82 will not be set until state 1 expires and a full cycle (nominally 70 milliseconds) of timer circuit 90 has subsequently run its course. (As will be further explained below, timer output link 89, which rests in a high state during standby, has a retriggerable cycle (e.g., a low state of 70 milliseconds) which commences or recommences every time a key is depressed or continues to be depressed, or the dialler unit 30 annunciates its activity by asserting or continuing to assert its "mute" output, or state 1 commences or continues to exist, thus assuring that any porting of keypad contacts to the dialler unit 30 via transmission gates IGC1-IGR4 will be sustained for a sufficient period of time to allow dialler unit 30 to internally qualify the contact closure and to subsequently maintain the established porting by asserting its "mute" output until its own internal keypad-decoding logic has determined that all keypad activity has ceased.)

As pointed out above, output link 52 from counter 101 is coupled to port GP2 of column C4 transmission gate DGC4. During the standby state STO, the state of link 52 was low, so that each of the column-associated transmission gates DGC1 . . . DGC4 applied a low condition via its associated column interconnect link IC1 . . . IC4 to the column ports of keypad 10. Upon being incremented from state 0 to state 1, state counter 101 causes link 52 to go high, so that transmission gate DGC4 will couple a high voltage level over link IC4 to port KPC4 of keypad 10. Since it has been assumed that the key which has been depressed is key K42, residing in column C4, then the row link R2 of keypad 10 will transition from a low state to a high state (as a result of the closure of the crosspoints of key K42), so that a high voltage state will be coupled over link IR2 through transmission gate DGR2 and onto line 42, thereby causing capacitor C2 to quickly charge. As capacitor C2 charges, the input to inverter IR2 changes from a low level to a high level, so that its output, in turn, goes low, changing the state on link DR2 and causing the output of OR gate 71 to go low.

It should be noted that if the operated key does not reside in column C4, then the change in state (low to high) at port GP2 of transmission gate DGC4 will not be applied to any of the row interconnect links IR1 . . . IR4 between keypad 10 and transmission gates DGR1 . . . DGR4, so that the output OR gate 71 will remain unchanged. It can be seen, therefore, that, by virtue of the sequential processing operation carried out using state counter 101, advancing, or being incremented, from state 0 to state 1, as a result of the events which take place in state 1, it can be determined whether or not the operated key resides or dogs not reside in column C4.

Specifically, if OR gate 71 changes state (goes from high to low) during state 1, then it is known that the depressed key resides in column C4. Conversely, if output 73 from OR gate 71 does not change from a high to a low condition during state 1, then it is known that the depressed key does not reside in column C4 (i.e. is not associated with one of the special test function keys K41 . . . K44).

It should also be observed that, with each of transmission gates BGR1 through BGR4 disabled, there is no longer a pull-up resistor load placed on links 41–44, so that the only load placed upon each keypad "row" link is the impedance provided by capacitors CR1 . . . CR4 and the high impedance input of the inverters IR1 . . . IR4. Consequently, the circuitry is very tolerant of extremely poor key switch characteristics, since even only a few microseconds of key switch continuity will cause an appropriate logic state to be stored in one of capacitors C1 . . . C4 corresponding to the activated one of key switches K11 . . . K44.

Upon the occurrence of the next clock pulsed produced by timer 91, state counter 101 is incremented from state 1 to state 2, thereby changing the state of output link 52 from a high state to a low state and changing the state on output oink 103 from a low state to a high state. The change in state on link 103 is applied to the clock input of key location flip-flop 111, the D input of which is coupled to link 77, representative of whether or not the activated key is located in column C4. As pointed out previously, if the activated key is located in column C4, which is associated with the preselected group of keys K41–K44 that possess auxiliary test functionality, then the interface unit will generate a corresponding test function signal over one of links 23, 25, 27 and 65.

The Q output of flip-flop 111 is coupled to one input of NOR gate 133, the output of which is coupled directly to link 51 and to link 61 through inverter 134. As pointed out previously, links 51 and 61 supply control input for transmission gates DGR1 . . . DGC4 and gates IGR1 . . . IGC4, respectively. The $\overline{Q}$ output of flip-flop 111 is coupled over link 115 to one input of NAND gate 121, the output of which is coupled over link 122 to one input of NOR gate 131. The output of NOR gate 131 is coupled over link 151 to one input of each of NAND gates 161 and 201 within a test function logic circuit, to be described below.

The state 2 output link 103 of counter 101 is coupled to a second input of NAND gate 121 and to inputs of each of NOR gate 95 and flip-flop 81. When state counter 101 transitions from state 1 to state 2, the change in state on link 103 inhibits NOR gate 95, so that further clock pulses cannot be applied to counter 101. It also resets flip-flop 81, so as to change the state of link 86 and once again place pull-up resistors PR1 . . . PR4 on each of links 41–44 (through transmission gates BGR1). With flip-flop 81 changing state, output link 84 to flip-flop 82 changes state, thus removing the input reset condition, so that flip-flop 82 may be reset by the change in state on link 89 from timer 90 at the end of the expiration of a time out interval (on the order of 70 milliseconds) to be described below.

With NAND gate 121 being controlled by the state 2 output 103 of state counter 101, the combination of this NAND gate and NOR gates 131 and 133 and inverter 134 ensure that output links 151 and 61 will never be simultaneously high, thereby always ensuring that the monitoring and control circuitry of the keypad interface unit will not be monitoring the operation of the keypad at the same time that the telephone dialler unit 30 is active.

As pointed out previously, normally open "shift" switch S1, when depressed and held down by the craftsperson, effectively 'forces' the test set into a dialler unit-active mode, decoupling the monitor and control logic of the interface unit from the keypad, so that the keypad directly couples each of its output key ports to the telephone dialler unit 30. The "shift" switch input is coupled over link 24 through a switch contact-debounce timer circuit 45 (having a delay time on the order of 33 milliseconds), the output of which is coupled over link 141 to each of NOR gates 131 and 133. The operation of "shift" switch S1 causes link 141 to change state (after a minor delay to absorb any bounce in the switch by the operation of timer circuit 45), which effectively forces line 61 into a high state (and conversely line 51 into a low state). During this 'forced' condition, each of transmission gates DGR1 . . . DGC4 is disabled (as opposed to being enabled during the normal standby condition of the interface unit, described previously), so that the keypad monitoring circuitry within the interface unit 20 cannot receive any inputs from the keypad. During this mode of operation, telephone dialler unit 30 becomes active in response to any keypad pushbutton activity, and supplies a MUTE signal over link 31 to NOR gate 75, which effectively maintains the keypad monitoring circuitry within the interface unit decoupled form the keypad. Once the telephone dialler unit has completed its current task (e.g. producing a DTMF signal dial pulses, pause, etc.), and the craftsperson has released switch S1, then, with the MUTE signal removed from NOR gate 71, timer 90 will time out, causing a change in state on output link 89, thereby setting flip-flop 82 which, in turn, resets the state counter 101 and flip-flop 111. The resetting of these components reverts the condition of the interface unit to its standby condition (state 0) in which each of transmission gates DGR1 . . . DGC4 is enabled, so as to permit the interface unit to monitor each of the output ports of keypad 10. In addition, pull-up resistors PR1 . . . .PR4 remain enabled through their associated transmission gates BGR1 . . . BGR4, to ensure that the interface unit will not falsely detect the operation of a key switch until a key switch is actually depressed.

As pointed out previously, the keypad interface unit of the present invention provides a facility for an auxiliary set of special functions to be carried out through the use of a preselected group of the keys of the keypad. In the present example, those keys consist of keys K41 . . . K44 resident in column C4 of the keypad.

As noted above, when output link 151 goes high, indicative of an auxiliary test function condition, each of NAND gates 161, 171 and 201 is enabled and transmission gate 181 becomes conductive. Recalling that, when state counter 101 transitioned from state 1 to state 2, link 86 changed state, causing transmission gates BGR1 . . . BGR4 to be rendered conductive, pull-up resistors PR1 . . . PR4 were reinserted between the high voltage terminal and each of lines 41–44. As a consequence, the depression of one of when keys K41 . . . K44 in column C4 will cause the output of a corresponding one of inverters IR1 . . . IR4 to change state (go high).

If the depressed key is key K41, then detect row link DR1 goes high. With link 151 being held high by the signal at the output of NOR gate 131, described previously, the output of NAND gate 171 turns off transmission gate 173, which is coupled in series with the tone/-pulse selector switch S2 (see FIG. 1), thereby forcing a selection of a pulse dialling mode within telephone dialler unit 30. The output of NAND gate 171 is inverted by inverter 175 to high logic level. The output of inverter 175 is coupled over link 65 to the control input of control gate CGRCI, so as to provide a continuity path between the row R1 and column C1 input ports of telephone dialler unit 30. Since telephone dialler unit 30 is now in the pulse mode of operation and is coupled to the row 1, column 1 links of keypad 10, (simulating the operation of K11), the result is that the telephone dialler unit produces a dial pulse "1" (corresponding to a hookflash).

If the key switch that has been activated resides in row R2 (as was described previously for purposes of an illustrative example), then the change in state on link DR2 is coupled through transmission gate 181 to output link 23, producing a signal PTEST (the polarity-test enabling signal).

If the key resides in row R3 (key K43 has been depressed), then a second input is applied via link DR3 to NAND gate 161, the output of which is coupled through inverter 162 over link 163 to the control input of transmission gate 191. Since port GP1 of transmission gate 191 is hard-wired (low) to ground, its output on link 25 now receives a low signal to be applied to its Line Disconnect Not port LDN. This line may be wire-ORed with the PULSE_OUT (BAR) line 35 of the telephone dialler unit 30 to produce a dial-pulse open (high impedance-tip-to-ring (disconnect)) condition.

Should the operated key reside in row R4 (key switch K44), then the resulting high input to the second input of NAND gate 201 will cause a change in state in the output link 27 via inverter 205. This output is the ERENB (Earth-Recall-ENaBle (ground-start)) signal which causes a downstream circuit to provide a conductive path from earth ground to tip and ring.

As will be appreciated from the foregoing description, the keypad-to-dialler interface unit of the present invention enables the functionality of a telephone test set to be augmented with the capability of using the keypad to access the telephone dialling signal generator and to controllably activate prescribed test function circuitry, without subjecting either the dialling circuitry or the additional test function circuitry to interference as a result of the use of the same set of keypad switches for controlling each separate function and without the need to substantially modify the physical casing in which the test set circuitry is housed.

In accordance with a further aspect of the present invention, through a minor additional modification of test set signal processing circuitry (specifically using passive signal coupling components, i.e. transformer, resistor, capacitor and diode), it becomes possible to use the test set's microphone as a means of providing audible ringing to the craftsperson.

Figures 6, 7:
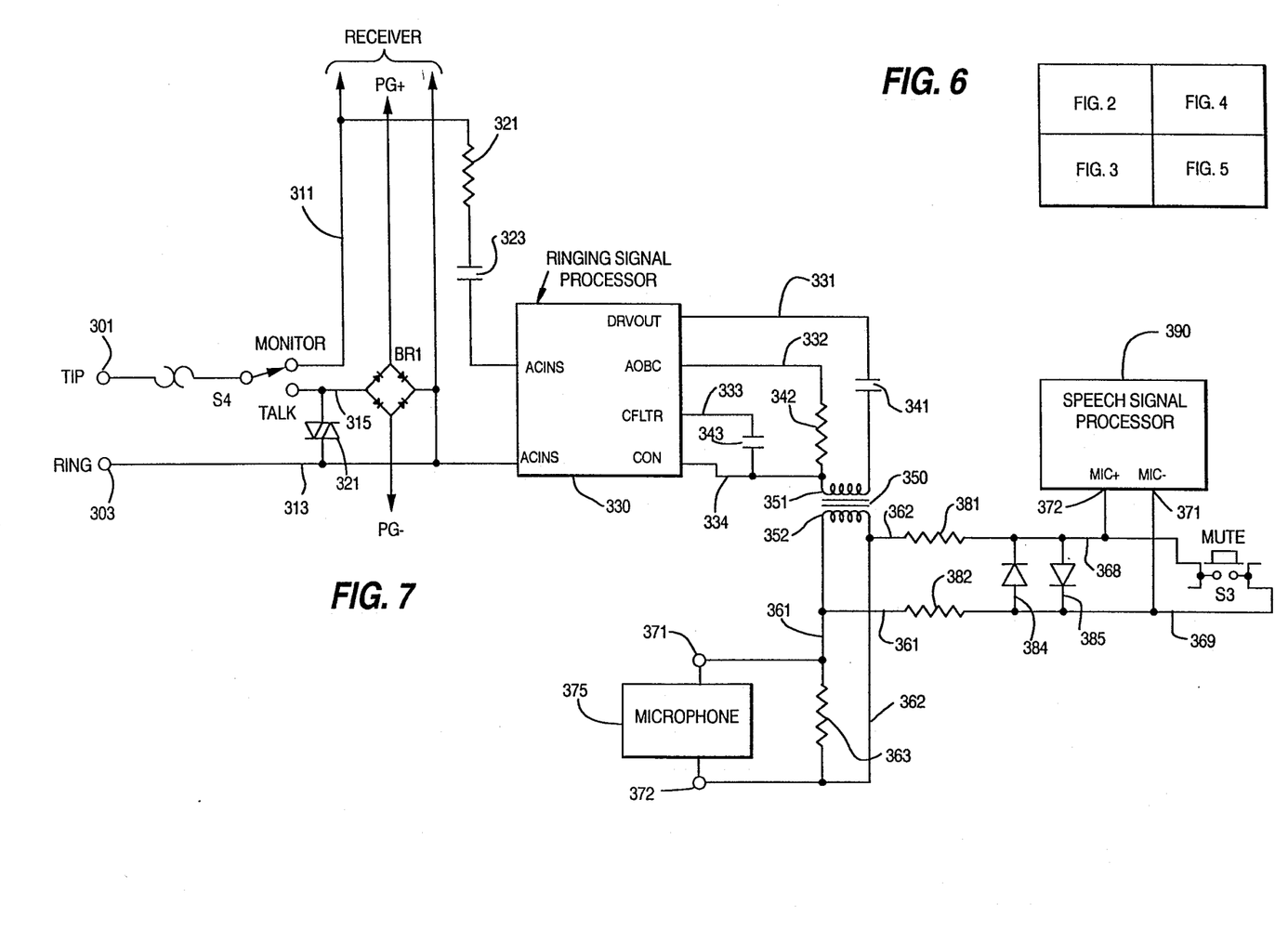

More particularly, referring to FIG. 7, the ringing voltage detection circuitry of a conventional test set is shown as including tip and ring input ports 301 and 303, respectively, Which are coupled over links 311 and 313 to the AC ringing voltage inputs ACIN1, ACIN2 of a ringing signal processor 330. Ringing signal processor 330 is typically in the form of an integrated circuit chip, such as a Texas Instruments TCM 1539AP chip, which converts an AC ringing voltage signal applied to its inputs ACIN1, ACIN2, (which are coupled to tip and ring ports 301, 303) into a warble-tone voltage for driving an electro acoustic transducer. Tip link 311 is further coupled to the MONITOR terminal of a conventional monitor/talk switch S4, the TALK terminal of which is coupled over link 315 to a bridge rectifier BRI and a protective diode 321 coupled between link 315 and 313, and the arm of which is coupled to tip input port 301. The tip and ring links 311 and 313 are also coupled to the receiver portion of the test set, not shown. Provided in the tip link 311 is a resistor-capacitor protective impedance 321–323.

The respective output connections of ringing signal processor 330 include a drive out port link 331 and a common port link 334, which are coupled to the opposites sides of a primary winding 351 of an impedance matching transformer 350. The drive out link 331 is capacitively coupled through a D.C. blocking capacitor 341 to the primary winding. Additional resistive oscillator and capacitor filter output port links 332 and 333 are coupled through resistor 342 and capacitor 343, respectively, to common port link 334.

In a conventional test set, the output of the ringing signal processor is coupled to its own speaker, exclusively dedicated for the purpose of providing an audible warble tone. In accordance with the present invention, however, the warble tone output is coupled to the test set transmitter/microphone 375, through which speech signals are normally supplied by the craftsperson to a test set speech signal processor 390. As the details of speech signal processor 390 and its interconnection to other portions of the test set are unnecessary for gaining an appreciation of the present invention, given the remaining illustration in FIG. 7 and the description herein, such details will be provided. For purposes of an illustrative example, however, speech signal processor 390 may be a commercially available speech signal processor chip such as a TEA 1080 chip manufactured by Signetics Inc.

The dual interfacing/use of the test set microphone 375 is accomplished by the transformer coupling of the output of the ringing signal processor 330 to the microphone 375 and the isolation coupling of the microphone between the ringing signal processor 330 and the speech signal processor 390. For this purpose, transformer 350 has a secondary winding 352, one terminal of which is coupled over link 361 to one end of a resistor 382, the opposite end of which is coupled over link 369 to a first microphone connection port (MIC−) 371. The opposite terminal of secondary winding 352 is coupled over link 362 to one end of a resistor 381, the opposite end of which is coupled over link 369 to a second microphone connection port (MIC+) 372. A resistor 363 bridges lines 361 and 362. Lines 368 and 369 are further coupled to opposite sides of a normally open MUTE pushbutton switch S3. A pair of inversely connected protection diodes 384 and 385 are coupled across links 368, 369, as shown.

In accordance with the operation of the circuit configuration shown in FIG. 7, DC blocking capacitor 341 and impedance-matching transformer 350 provide a passive circuit interface between ringing signal processor 330 and microphone 375. In response to an AC ringing signal applied to tip and ring ports 301, 303, respectively, warble tones generated by ringing signal processor 330, in the presence of an incoming AC ringing excitation applied to tip and ring ports 301 and 302, respectively, are coupled through capacitor-transformer interface 341–350 over links 361 and 362 to microphone 375, which converts the warble tone signal into an output acoustic signal that is audible to the craftsperson.

In the absence of a AC ringing excitation, the output of ringing signal processor 330 on lines 331 and 334 reverts to a high-impedance state, so as not to appreciably load (attenuate) the output of microphone 375 during the normal "talk-mode" operation of the test set. As a consequence, it is unnecessary to provide an additional switch to electrically remove the connection of ringing signal processor 330 from the microphone 375 during the talk-mode of operation.

Resistors 381, 382 and diode pair 384, 385 provide circuit protection for speech signal processor 390, by limiting the amplitude of the warble-tone ringing voltages on lines 362 and 361 to a value that falls within the acceptability range of the microphone inputs of the processor. Resistors 381, 382 also permit the MUTE switch S3, when depressed, to effectively mute the talk function, by placing a direct short across the microphone inputs to the speech signal processor 390 but, at the same time, providing a resistive termination to the microphone 375, so that the mute-operation will have minimal effect upon the audible-ringing function of the microphone.

Thus, in accordance with a second test set-enhancement feature of the present invention, a circuit arrangement is provided which allows the test set microphone to be used as a means of providing audible ringing to the craftsperson, thereby further improving hardware functionality, without impacting the normal voice input functionality of the microphone and associated speech signal processor.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a telephone test set having a keypad containing a matrix of key contact links, respective rows and columns of which are selectively intercoupled by the selective operation of keys associated with crosspoints of said matrix, and a telephone dialling signal generator for generating prescribed telephone signals in accordance with said selective operation of keys of said matrix, an arrangement for controllably interfacing the rows and columns of said key contact links with said telephone dialling signal generator comprising:

first means, coupled between row and column output ports for the rows and columns of said key contact links and row and column input ports for said telephone dialling signal generator, for controllably coupling said matrix of key contact links to said telephone dialling signal generator, so that said telephone dialling signal generator may generate telephone dialling signals in accordance with the operation of keys of said keypad for a first mode of operation of said arrangement;

second means, coupled between row and column output ports for rows and columns of said key contact links and row and column input ports for said telephone dialling signal generator, for controllably decoupling said matrix of key contact links from said telephone dialling signal generator, while producing prescribed telephone equipment test condition representative signals in accordance with the operation of keys of said keypad, for a second mode of operation of said arrangement; and third means, coupled to said first and second means, for controlling said first and second modes of operation of said arrangement.

2. An arrangement according to claim 1, wherein said third means includes means for controllably inhibiting the operation of said second means during the active state of said telephone dialling signal generator.

3. An arrangement according to claim 1, wherein said second means comprises first controlled switch means coupled in circuit between key contact links of said matrix and said input ports of said telephone dialling signal generator, for preventing said telephone dialling signal generator from monitoring the states of operation of said matrix of key contact links during said second mode of operation of said arrangement.

4. An arrangement according to claim 3, wherein said second means comprises second controlled switch means, coupled in circuit with key contact links of said matrix, for enabling the state of operation of said key contact links to be monitored therethrough, and control means, coupled to said second controlled switch means and responsive to the operation of preselected keys of said keypad, for causing prescribed telephone equipment test condition representative signals to be produced.

5. An arrangement according to claim 4, wherein said control means comprises test signal generation means, coupled to said second controlled switch means and said third means, for controllably generating said prescribed telephone equipment test condition representative signals during said second mode of operation of said arrangement and in accordance with the operation of said preselected keys of said keypad.

6. An arrangement according to claim 5, wherein said third means includes mode switch means, mounted on said test set and coupled to said control means, for preventing said control means from controllably generating said prescribed telephone equipment test condition representative signals and for causing said first controlled switch means to couple said key contact links of said matrix with said input ports of said telephone dialling signal generator and thereby enable said telephone dialling signal generator to monitor the states of operation of said matrix of key contact links during said first mode of operation of said arrangement.

7. An arrangement according to claim 6, wherein said second means includes means, responsive to the operation of said telephone dialling signal generator, for preventing said second controlled switch means from enabling the state of operation of said key contact links to be monitored therethrough and the production of said prescribed telephone equipment test condition representative signals by said control means, for a prescribed period of time subsequent to the termination of operation of said telephone dialling signal generator.

8. An arrangement according to claim 1, wherein said third means includes mode switch means, mounted on said test set and coupled to said first and second means, for preventing said second means from controllably generating said prescribed telephone equipment test condition representative signals and for enabling said telephone dialling signal generator to monitor the states of operation of said matrix of key contact links during said first mode of operation of said arrangement.

9. An arrangement according to claim 8, wherein said second means includes means, responsive to the operation of said telephone dialling signal generator, for preventing the production of said prescribed telephone equipment test condition representative signals for a prescribed period of time subsequent to the termination of operation of said telephone dialling signal generator.

10. For use with a telephone test set having a keypad containing a matrix of key contact links, respective rows and columns of which are selectively intercoupled by the selective operation of keys associated with crosspoints of said matrix, and a telephone dialling signal generator for generating prescribed telephone signals in accordance with said selective operation of keys of said matrix, an arrangement for controllably interfacing the rows and columns of said key contact links with said telephone dialling signal generator comprising:

first means, coupled between row and column output ports for rows and columns of said key contact links and row and column input ports for said telephone dialling signal generator, for controllably decoupling said matrix of key contact links from said telephone dialling signal generator while monitoring the operation of keys of said keypad, during a first mode of operation of said arrangement;

second means, responsive to the operation of at least one preselected key of said keypad during said first mode of operation of said arrangement, for producing a corresponding at least one prescribed telephone equipment test condition representative signal associated with the operation of said at least one preselected key of said keypad;

third means, coupled between row and column output ports for the rows and columns of said key contact links and row and column input ports for said telephone dialling signal generator, for controllably coupling said matrix of key contact links to said telephone dialling signal generator, so that said telephone dialling signal generator may generate telephone dialling signals in accordance with the operation of keys of said keypad during a second mode of operation of said arrangement; and fourth means, coupled to said first and second means, for controlling said first and second modes of operation of said arrangement such that said first and second modes of operation of said arrangement do not overlap one another.

11. An arrangement according to claim 10, wherein said first means comprises first controlled switch means coupled in circuit between key contact links of said matrix and said input ports of said telephone dialling signal generator, for preventing said telephone dialling signal generator from monitoring the states of operation of said matrix of key contact links during said first mode of operation of said arrangement.

12. An arrangement according to claim 11, wherein said first means comprises second controlled switch means, coupled in circuit with key contact links of said matrix, for enabling the state of operation of said key contact links to be monitored therethrough, and means, coupled to said second controlled switch means, for monitoring therethrough the operation of said at least one preselected key of said keypad and for enabling said second means to cause said at least one prescribed telephone equipment test condition representative signals to be produced in accordance with the operation of said at least one preselected key of said keypad.

13. An arrangement according to claim 12, wherein said second means comprises test signal generation means, coupled to said second controlled switch means and said fourth means, for controllably generating a prescribed telephone equipment test condition representative signal during said first mode of operation of said arrangement and in accordance with the operation of said at least one preselected key of said keypad.

14. An arrangement according to claim 13, wherein said fourth means includes mode switch means, mounted on said handset and coupled to said control means, for preventing said control means from controllably generating a prescribed telephone equipment test condition representative signal and for causing said first controlled switch means to couple said key contact links of said matrix with said input ports of said telephone dialling signal generator and thereby enable said telephone dialling signal generator to monitor the states of operation of said matrix of key contact links during said second mode of operation of said arrangement.

15. An arrangement according to claim 14, wherein said first means includes means, responsive to the operation of said telephone dialling signal generator, for preventing said second controlled switch means from enabling the state of operation of said key contact links to be monitored therethrough and the production of said prescribed telephone equipment test condition representative signals by said second means, for a prescribed period of time subsequent to the termination of operation of said telephone dialling signal generator.

16. For use with a telephone test set having a keypad containing a matrix of key contact links, respective rows and columns of which are selectively intercoupled by the selective operation of keys associated with crosspoints of said matrix, and a telephone dialling signal generator for generating prescribed telephone signals in accordance with said selective operation of keys of said matrix, an arrangement for controllably interfacing the row and column output ports of said keypad matrix with said telephone dialling signal generator comprising:

a first plurality of controlled transmission gate circuit means, respective ones of which are coupled between the row contact link and column contact link output ports of the keypad matrix and row and column input ports of the telephone dialling signal generator, for controllably decoupling the keypad contact links from the telephone dialling signal generator for a first mode of operation of said arrangement;

key operation detection and control circuit means for monitoring the output ports of said keypad to detect the operation of a key and for generating control signals in accordance therewith;

a second plurality of controlled transmission gate circuit means, coupled to said key operation detection and control circuit means, respective ones of which second plurality being coupled to the row contact link and column contact link output ports of the keypad matrix, so as to permit said key operation detection and control circuit means to monitor the operation of the keypad and determine whether an operated key is one of a preselected group of keys in response to the operation of which, during said first mode of operation of said arrangement, prescribed auxiliary test signals are to be generated; and auxiliary function signal generator means for controllably generating prescribed auxiliary test signals in accordance with the operation of a key of said preselected group for said first mode of operation of said arrangement; and wherein said key operation detection and control means includes means, responsive to detecting that an operated key is one of the preselected group, for causing said auxiliary function signal generator means to respond to an operated one of said preselected group of keyswitches and generate a prescribed auxiliary test signal associated therewith.

17. An arrangement according to claim 16, wherein said key operation detection and control means includes means, responsive to detecting that an operated key is not one of said preselected group, for causing said control circuitry to disable said auxiliary function signal generator means and reverse the conductive states of the first and second pluralities of transmission gate means, and, for a second mode of operation of said arrangement, thereby isolating said key operation detection and control circuit means from said keypad output ports, and coupling said keypad output ports to said dialling signal generator, so that it may respond to the operation of the keypad.

18. An arrangement according to claim 17, further including bypass mode switch means, coupled to said key operation detection and control circuit means, for causing said key operation detection and control circuit means to generate control signals through which said first plurality of controlled transmission gate circuit means couples output ports of said keypad to said dialling signal generator and said second plurality of transmission gate means decouples the output ports of said keypad from said key operation detection and control circuit means.

19. An arrangement according to claim 18, further including mode change delay means, coupled to said key operation detection and control circuit means and said dialling signal generator, and responsive to the state of operation of said telephone dialling signal generator, for causing said key operation detection and control circuit means to prevent said first and second pluralities of transmission gates from being placed in said first mode of operation, and thereby prevent the keypad output ports from being monitored by the key operation detection and control circuit means, for a prescribed period of time subsequent to the termination of the active state of operation of said telephone dialling signal generator.

20. For use with a telephone test set having first and second input ports through which a ringing signal is coupled to a ringing signal detection circuit which generates an output signal representative of the ringing signal, and a microphone through which a telephone craftsperson voices audio speech signals to a speech signal processing circuit coupled thereto, an arrangement for enabling said microphone to be used to provide an audible output in accordance with said ringing signal comprising:

first means for electrically coupling the output of said ringing detection circuit to signal coupling ports of said microphone through which said microphone is coupled to input ports of said speech signal processing circuit; and second means, coupled in circuit with said microphone and input ports of said speech signal processing circuit for effectively limiting, at the input ports of said speech signal processing circuit, the amplitude of ringing signals that are coupled by said first means to said microphone.

21. An arrangement according to claim 20, wherein said first means includes a transformer having first and second windings, said first winding being coupled to output ports of said ringing signal detection circuit and said second winding being coupled to the signal coupling ports of said microphone, and wherein said second means comprises means for providing resistive impedance between said second winding and the input ports of said speech signal processing circuit.

22. An arrangement according to claim 21, wherein said second means includes a rectifier circuit coupled in circuit with said resistive impedance.

23. An arrangement according to claim 22, further including mute switch means, coupled in circuit with the input ports of said speech signal processing circuit, for switchably bridging the input ports of said speech signal processing circuit and being coupled in circuit with said resistive impedance such that the closure of said mute switch means places said resistive impedance across the second winding of said transformer.

* * * * *